L. J. PARYZEK.
LIQUID DEPTH OR AMOUNT GAGE.
APPLICATION FILED MAR. 31, 1916.

1,274,932.

Patented Aug. 6, 1918.
2 SHEETS—SHEET 1.

Witnesses

Inventor
L. J. Paryzek,
By Victor J. Evans
Attorney

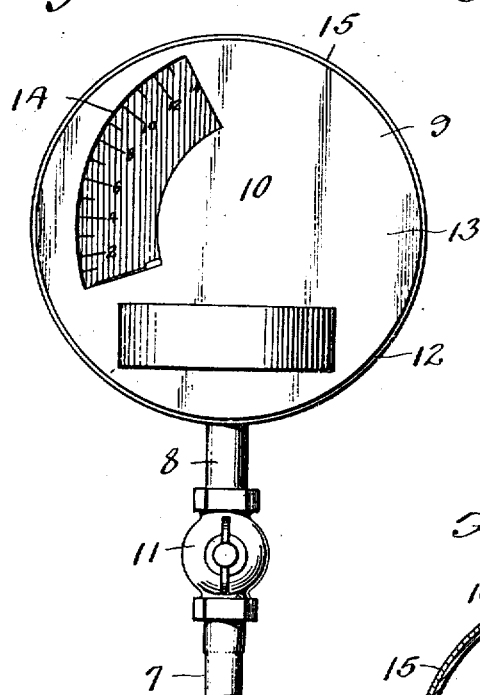
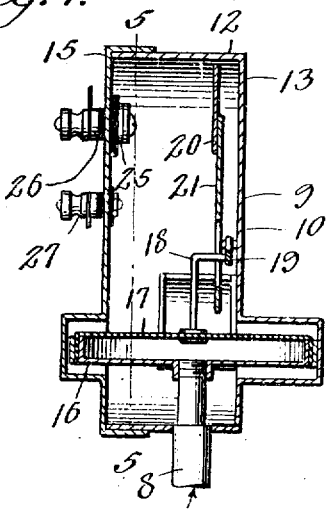
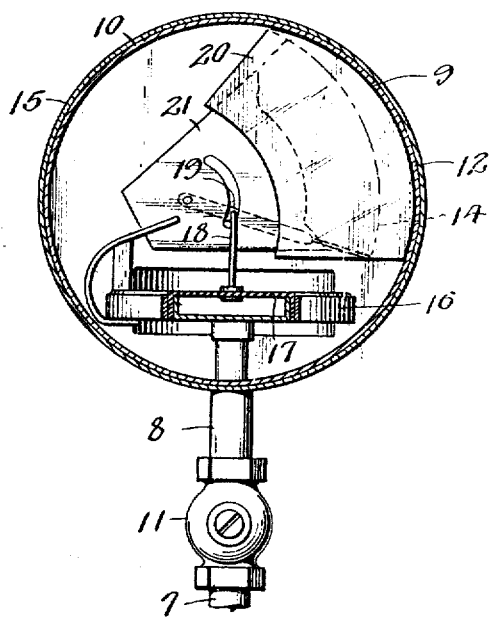
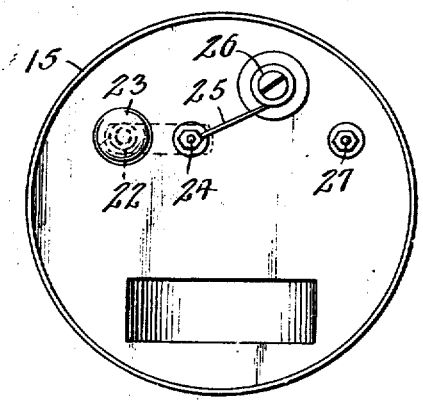

UNITED STATES PATENT OFFICE.

LEO JAMES PARYZEK, OF CLEVELAND, OHIO.

LIQUID DEPTH OR AMOUNT GAGE.

1,274,932.  Specification of Letters Patent.  Patented Aug. 6, 1918.

Application filed March 31, 1916. Serial No. 88,058.

*To all whom it may concern:*

Be it known that I, LEO J. PARYZEK, a citizen of the United States, residing at Cleveland, in the county of Cuyahoga and State of Ohio, have invented new and useful Improvements in Liquid Depth or Amount Gages, of which the following is a specification.

This invention relates to a liquid depth or amount gage, and particularly to a gage for indicating the quantity of gasolene in the gasolene tank of an automobile, or for analogous uses in indicating the amount of liquid in any other kind of tank.

The primary object of the invention is to provide an indicator which includes a pneumatically operated indicating device, and an air column in sealed connection with the body of liquid, and which is controlled by compression and expansion according to the level of the liquid for indicating the depth or amount of liquid contained in the tank.

A further object of the invention is to provide an indicator which may be conveniently applied to any ordinary type of automobile, and in which the indicating element may be supported upon the steering wheel or dash board, in position to be conveniently observed.

A further object of the invention is to provide an indicator in which communication between the indicating device and air column may be cut off, as when the vehicle is running, so as to prevent damage to the working parts thereof from violent motion of the air due to the changing levels of the liquid.

A still further object of the invention is to provide an indicator which may be constructed and applied at a comparatively low cost, which is easily understood and accurate in character, and which is provided with illuminating means whereby the indicator may be read by night.

The invention consists of the features of construction, combination and arrangement of parts hereinafter fully described and claimed, reference being had to the accompanying drawings in which:—

Fig. 3 is a face view of the indicating gage on an enlarged scale.

Fig. 4 is a front to rear section through the gage and valve fitting.

Fig. 5 is a vertical transverse section on the line 5—5 of Fig. 4.

Fig. 6 is an inner face view of the detachable cover of the casing.

Figure 1:
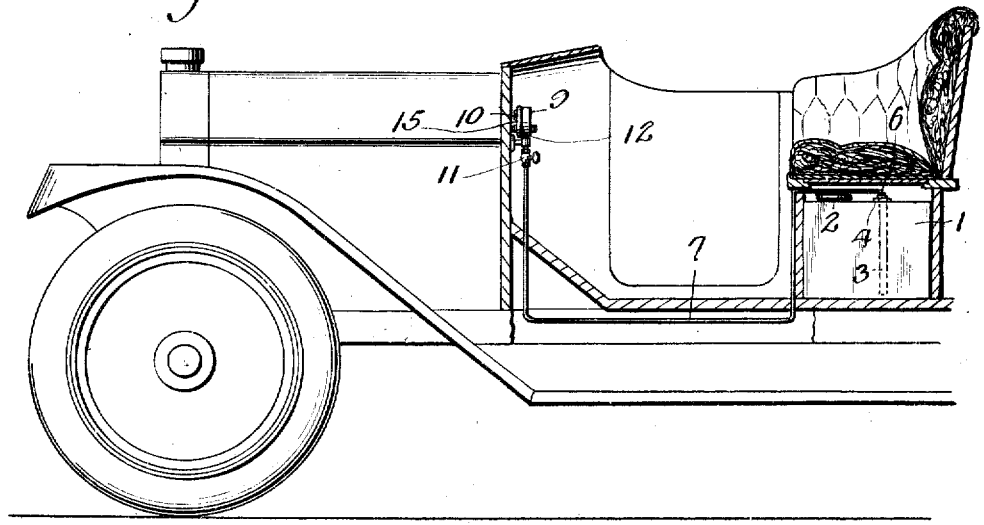
Figure 1 is a diagrammatic sectional elevation showing the application of the invention to an automobile.
Figure 2:
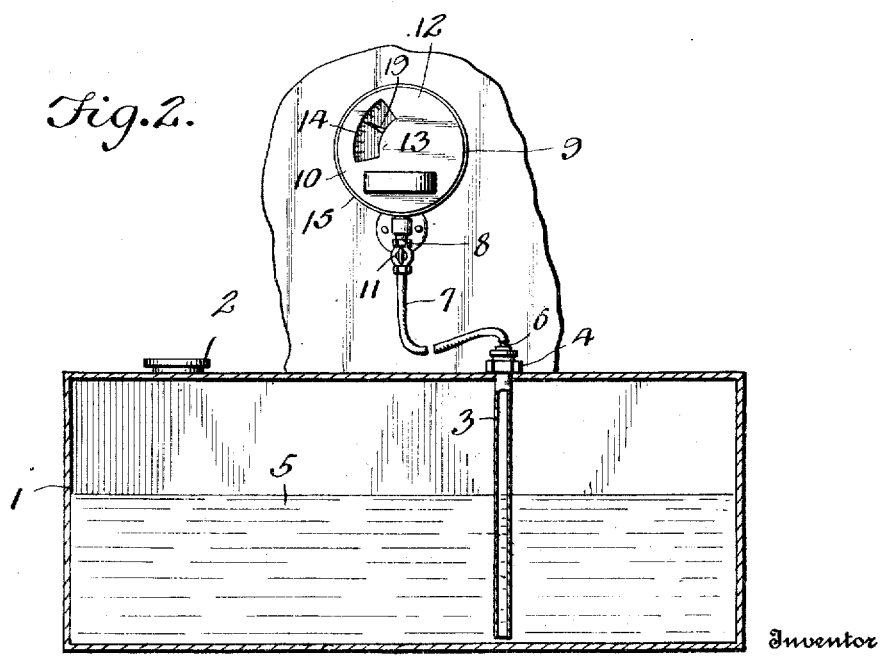
Fig. 2 is a sectional view through the tank and view in elevation of the parts of the indicator on an enlarged scale, the rigid column tube also appearing in section.

Referring to the drawings, 1 designates a liquid storage tank, such as the gasolene tank of an automobile, which is provided with the usual suitably closed filling inlet 2. Fitting within an opening in the top of this tank and extending downwardly thereinto is a tube 3, of copper or other rigid material. This tube 3 is of suitable length and proper diameter and has its upper end extending outward through a stuffing box 4, whereby it may be held in position. The lower end of the tube 3 terminates a short distance above the bottom of the tank, and is normally submerged within the body 5 of gasolene or other liquid contained in the tank.

The upper end of the tube 3 is provided with a nipple 6 for the attachment thereto of one end of another tube 7. This tube 7 may be and preferably is of smaller diameter than the tube 3 and connects said tube 3 with an inlet pipe or fitting 8 connected with the casing 9 of the indicator gage 10, which pipe or fitting is provided with a valve 11 for cutting off or letting on communication between the tubes 3 and 7 and a pressure influenced member disposed within the indicator casing.

In practice, the indicator gage is mounted in any suitable manner upon the steering wheel or post or upon the dashboard of the vehicle, so as to be conveniently within the range of vision of the driver of the automobile. According to circumstances, the tube 7 may be either rigid or flexible, and it will be understood that in practice the tubes 3 and 7 inclose a body of air forming an inclosed column extending between the body of liquid in the lower end of the tube 3 and the said pressure influenced member in the gage casing, whereby said member is adapted to be influenced by variations of pressure of the air column due to variations in the level of the liquid, as hereinafter fully described.

The casing 9 of the liquid gage device 10 comprises a body portion 12 provided with a front wall or plate 13 having a segmental observation opening 14 therein, and said casing body is open at the rear and closed by a removable cover 15, which may be of the slip-joint type or secured in position in any suitable manner. Within the casing body is arranged the pressure influenced member, which comprises a circular casing or chamber 16 connected at its base with the upper end of the pipe or fitting 8 and closed at its top by a diaphragm 17 of rubber or other suitable elastic material. Connected with this diaphragm is a stem 18 which is also connected with a pivoted end or pointer 19 arranged to move in rear of the opening 14 and over the face of a dial or indicating table 20, the diaphragm operating under variations of air pressure in the air column tube to variably operate the hand or pointer, as will be readily understood.

The pointer is pivoted to a slotted bracket plate 21 which is arranged in spaced relation to the opening 14, and the dial or table 20 is suitably secured to the said bracket plate. This dial is made of some suitable transparent or translucent material and bears upon the face thereof suitable indicia for indicating amounts in inches or gallons or fractions thereof, or any other desired and suitable units of measurements, based upon the level of the liquid in the tank 1 and tube 3. Provided upon the cover 15 is a socket 22 receiving the base of an electric lamp 23, one of the terminals of which engages a contact 24 insulated from the cover and connected by a wire 25 with a binding post 26, also insulated from the cover. Another binding post 27 is electrically connected with the cover, and the said binding posts are adapted to be connected with conductors from any suitable source of electric supply to supply current to the lamp the light from which will shine through the transparent or translucent scale plate, rendering the same and the pointer clearly visible at night time.

It will be seen from the foregoing description that the invention provides an indicator of the character described which is simple of construction, capable of being readily and conveniently applied for use, which can be manufactured and sold at a comparatively low cost, and which is reliable and efficient for its intended purpose.

I claim:—

A depth indicating gage comprising a housing provided with a sight opening, a cylindrical casing secured within the lower portion of said housing, a tube communicating with said casing and adapted for connection with a tank, whose contents are to be gaged, to provide an inclosed air column between the liquid in the tank and the casing, an expansible diaphragm closing the top of said casing, a vertical bracket plate secured within said housing above said casing, a pointer arm pivoted upon said bracket plate, a segment provided with indicia, said pointer arm being movable over said segment, said plate being provided with an arcuate slot concentric with said pivot, and a vertical connecting rod secured at one end centrally on said diaphragm and having its upper end bent and extending horizontally through said slot and connected with said pointer arm, said slot guiding and limiting the movement of said connecting rod.

In testimony whereof I affix my signature in presence of two witnesses.

LEO JAMES PARYZEK.

Witnesses:
E. J. ALIST,
LEO PARYZEK.